United States Patent
Saito

(10) Patent No.: US 7,588,064 B2
(45) Date of Patent: Sep. 15, 2009

(54) PNEUMATIC TIRE AND METHOD OF MANUFACTURING THE SAME

(75) Inventor: Eiji Saito, Hiratsuka (JP)

(73) Assignees: The Yokoham Rubber Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 426 days.

(21) Appl. No.: 11/340,462

(22) Filed: Jan. 27, 2006

(65) Prior Publication Data

US 2006/0118225 A1 Jun. 8, 2006

Related U.S. Application Data

(63) Continuation of application No. 10/363,393, filed as application No. PCT/JP02/05345 on May 31, 2002, now Pat. No. 7,037,395.

(30) Foreign Application Priority Data

Jun. 7, 2001 (JP) .............................. 2001-173116
Jun. 7, 2001 (JP) .............................. 2001-173118

(51) Int. Cl.
B60C 19/12 (2006.01)
B29C 73/22 (2006.01)

(52) U.S. Cl. .................... 152/505; 156/115; 156/123

(58) Field of Classification Search ............... 156/115, 156/123; 152/505, 507, 502–504, 521, 336.1
See application file for complete search history.

(56) References Cited

U.S. PATENT DOCUMENTS

| | | | |
|---|---|---|---|
| 1,959,460 A | 5/1934 | Crossan | |
| 1,977,281 A | 10/1934 | Knowlton | |
| 2,782,829 A | 2/1957 | Peterson et al. | |
| 2,877,819 A | 3/1959 | Gibbs | |
| 3,048,509 A | 8/1962 | Sweet et al. | |
| 3,444,918 A | 5/1969 | Goggins | |
| 3,910,334 A | 10/1975 | Gardner | |
| 4,057,090 A | 11/1977 | Hoshikawa et al. | |
| 4,262,624 A | 4/1981 | Soeda et al. | |
| 4,286,643 A | 9/1981 | Chemizard et al. | |
| 4,445,562 A | 5/1984 | Bohm et al. | |
| 4,919,183 A | 4/1990 | Dobson | |

FOREIGN PATENT DOCUMENTS

| | | |
|---|---|---|
| GB | 2 293 357 A | 3/1996 |
| JP | 50-025683 A1 | 8/1975 |

(Continued)

OTHER PUBLICATIONS

International Search Report for PCT/JP02/05345 mailed on Sep. 10, 2002.

Primary Examiner—Geoffrey L Knable
(74) Attorney, Agent, or Firm—Greer, Burns & Crain, Ltd.

(57) ABSTRACT

A pneumatic tire having a puncture preventive layer formed by windingly sticking a tube having seal material wrapped therein to the tire inner surface circumferentially of the tire and continuously and spirally with its side surfaces closely contacted each other: or a pneumatic tire having a puncture preventive layer formed by sticking micro balloons having seal material wrapped therein to the tire inner surface with their sides closely contacted with each other.

6 Claims, 3 Drawing Sheets

FOREIGN PATENT DOCUMENTS

| | | | | | | |
|---|---|---|---|---|---|---|
| JP | 52-047204 | A1 | 4/1977 | JP | 01-068903 A1 | 5/1989 |
| JP | 53-045803 | | 4/1978 | JP | 06-270283 A1 | 9/1994 |
| | | | | JP | 2002-059722 A1 | 2/2002 |

PNEUMATIC TIRE AND METHOD OF MANUFACTURING THE SAME

This is a continuation of application Ser. No. 10/363,393, filed Mar. 3, 2003, now U.S. Pat. No. 7,037,395, which is a 371 application of PCT/JP02/05345 filed on May 31, 2002, the entire contents being incorporated by reference. The present application claims priority based on Japanese Patent Application No. 2001-173116, filed Jun. 7, 2001, the entirety of which being incorporated herein by reference. The present application also claims priority based on Japanese Patent Application No. 2001-173118, filed Jun. 7, 2001, the entirety of which being incorporated herein by reference.

BACKGROUND OF THE INVENTION

1. Field of the Invention

The present invention concerns a pneumatic tire and a method of manufacturing the same, and more particularly, a pneumatic tire deploying an excellent puncture seal performance, without deteriorating the uniformity, riding comfort or the like of the tire and a method of manufacturing the same.

2. Detailed Description of the Prior Art

As a countermeasure for preventing a pneumatic tire from running over a nail or the like during the travel and being punctured, one provided with a seal material 30 of adhesive composition or the like, as puncture prevention layer 20, in an area corresponding to a tread 10 on the tire inner surface, as shown in FIG. 6 has been proposed. Even when this pneumatic tire treads, for instance, a nail into the tread 10 and the nail penetrates the tread, the puncture is prevented, because the nail hole is sealed with seal material 30 adhered around the nail.

However, as the seal material 30 is an adhesive liquid having fluidity, a phenomenon of flowing of the seal material 30 positioned in the tread shoulder area to the tread central area, due to the centrifugal force during a high speed revolution of the tire. Consequently, if a nail is stuck near the tread shoulder area, there was a drawback that it could not cope with the seal of this nail hole, reducing the puncture sealing.

As a countermeasure for resolving the flow problem due to the centrifugal force of such seal material, Japanese Patent Laid-Open 1978-45803 has proposed to form cells partitioned into a great number in an elastomer sheet, make an elastomer sheet where a seal material is divided and enclosed into these numerous cells, and paste this elastomer sheet to the tire inner surface. However, if a flat elastomer sheet is pasted all around the tire inner surface, there was a problem of deterioration in uniformity of the tire, because the splice portion where both end portions of the elastomer sheet are overlaid each other becomes heavier that the other portions, in the tire circumferential direction, and wrinkles or other form change are provoked in the curvature portion, in the shoulder area in the tire lateral direction.

Also, Japanese Patent Laid-Open 1978-55801 proposes to arrange a layer where seal material is dispersed in a soft rubber in a particulate form. However, as the particle of seal material is too minute in this tire, the sealing to the hole of the stuck nail is insufficient, and there was a drawback that it could not cope with a puncture due to a large nail or the like.

Besides, as a puncture prevention means without using a seal material, a run flat tire having a hard rubber or the like which is crescent in a cross section and inserted into the side wall as a reinforcement layer. However, this run flat tire has a drawback that the riding comfort lowers because the rigidity of the side wall increased due to the reinforcement layer.

SUMMARY OF THE INVENTION

The present invention has an object to resolve the aforementioned conventional drawbacks and provide a pneumatic tire deploying an excellent puncture seal performance, without deteriorating the uniformity, riding comfort or the like of the tire and a method of manufacturing the same.

A pneumatic tire of the present invention for attaining the aforementioned object is characterized by that it has a puncture preventive layer formed by windingly sticking a tube having seal material wrapped therein to the tire inner surface circumferentially of the tire and continuously and spirally with its method of manufacturing closely contacted with each other.

Another pneumatic tire of the present invention for attaining the aforementioned object is characterized by that it has a puncture preventive layer formed by sticking micro balloons having seal material wrapped therein to the tire inner surface with their sides closely contacted with each other.

Any splice portion will not be formed in the tire circumferential direction, nor the seal material be drifted in the tire lateral direction by the centrifugal force during the tire revolution, because the puncture preventive layer is composed by winding a tube having seal material wrapped therein circumferentially of the tire and continuously and spirally, in the former of the present invention, while the puncture preventive layer is formed by making micro balloons having seal material wrapped therein into contact closely with its side surfaces each other, in the latter of the present invention, as mentioned above. Consequently, it becomes possible not to result in the deterioration of the tire uniformity, nor in the deterioration of the puncture sealing due to the fluidity of seal material.

A method of manufacturing the aforementioned former pneumatic tire according to the present invention comprises steps of forming a lining layer by windingly sticking a tube having seal material wrapped therein to the tire inner surface of an unvulcanized tire circumferentially of the tire and continuously and spirally with its side surfaces closely contacted with each other and, thereafter, forming the lining layer into a puncture prevention layer by a vulcanizing of the unvulcanized tire.

A method of manufacturing the aforementioned latter pneumatic tire according to the present invention comprises steps of forming a lining layer by making micro balloons having seal material wrapped therein into contact closely with its side surfaces each other and, thereafter, forming the lining layer into a puncture prevention layer by vulcanizing the unvulcanized tire.

DETAILED DESCRIPTION OF THE PREFERRED EMBODIMENTS

Figure 1:
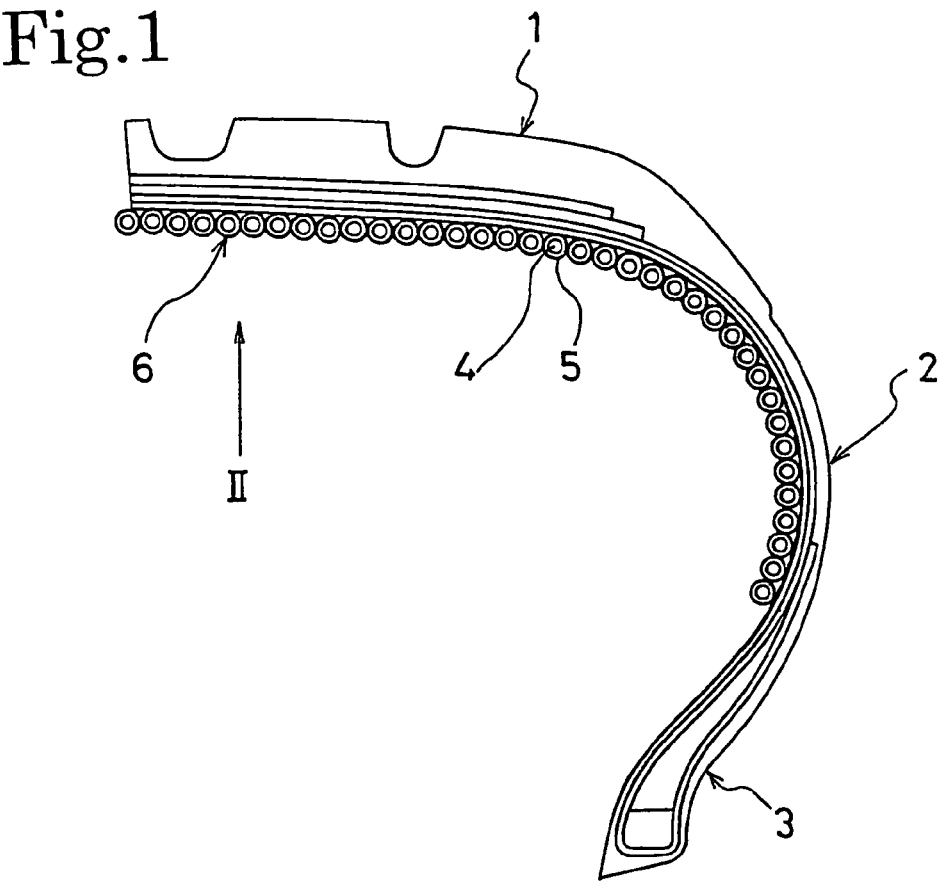
FIG. 1 is a half cross section in the meridian direction of a pneumatic tire comprised of an embodiment of the present invention.
Figure 2:
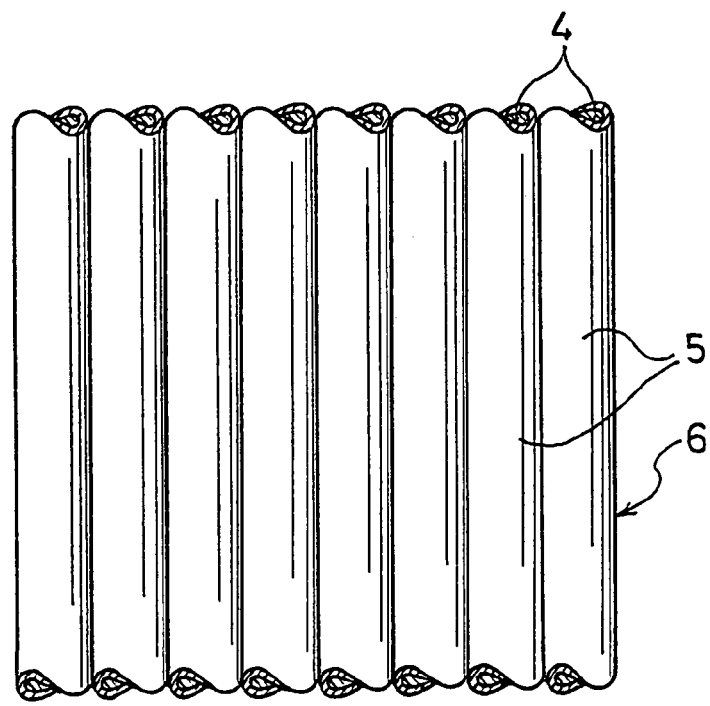
FIG. 2 is an arrow view of the tire inner surface along the arrow II in FIG. 1.

In the pneumatic tire shown in FIG. 1 and FIG. 2 comprised of an embodiment of the present invention, 1 is a tread, 2 a side wall and 3 a bead portion. The side wall 2 and the bead portion 3 are installed substantially symmetrically on both right and left sides of the tread 1, however one side is omitted in FIG. 1.

The inner surface of the aforementioned tire is lined with a tube 5 filled with a seal material 4 of adhesive composition or the like, by winding circumferentially of the tire and continuously and spirally with its side surfaces closely contacted with each other without gap, forming a puncture prevention layer 6. The helix angle in respect to the circumferential direction of the tire when the tube 5 is wound continuously is determined by the magnitude of the outer diameter of the tube 5 and the tire inner diameter, and a range of 1 to 10 degrees is preferable. The puncture preventive layer 6 may be installed in an area corresponding at least to the tread 1, in the tire inner surface, however, it may also extend up to an area corresponding to both side walls 2, as in the illustrated example.

If a vehicle mounted with a pneumatic tire comprised of the aforementioned composition runs a nail on the road into the tread 1 during the travel, and the nail penetrated into the tire, the tube 5 of the puncture preventive layer 6 will be broken through by the nail, and the seal material 4 filled therein flows out. Thus flown out seal material 4, seals the nail hole to adhere around and envelop the nail and prevents the air from leakage. Moreover, even when the nail falls off from the tread 1 by the centrifugal force or the like, the seal material 4 remains in the nail hole, closing the same, and preventing the air from leakage.

Besides, in the pneumatic tire of the aforementioned composition, since the seal material 4 is wrapped in the tube 5, and the tube 5 extends in the tire circumferential direction, it is restricted in the drift to the tire lateral direction. Consequently, the seal material 4 would not drift laterally to the central side of the tread by the centrifugal force generated by a high speed revolution of the tire. Hence, the puncture sealing will not decrease in the tread shoulder area, as in the tire of the prior art shown in FIG. 6.

Further, since the puncture preventive layer 6 is formed by winding a tube 5 having seal material 4 filled with therein continuously and spirally, not only the splice portion is not formed in the tire circumferential direction, but also wrinkles are not generated in the tire lateral direction, thereby the tire uniformity can be improved. Moreover, in the pneumatic tire of the aforementioned composition, as it is unnecessary to arrange a reinforcement layer of large rigidity in the side wall as in the run flat tire, the riding comfort will not be deteriorated.

Figure 3:
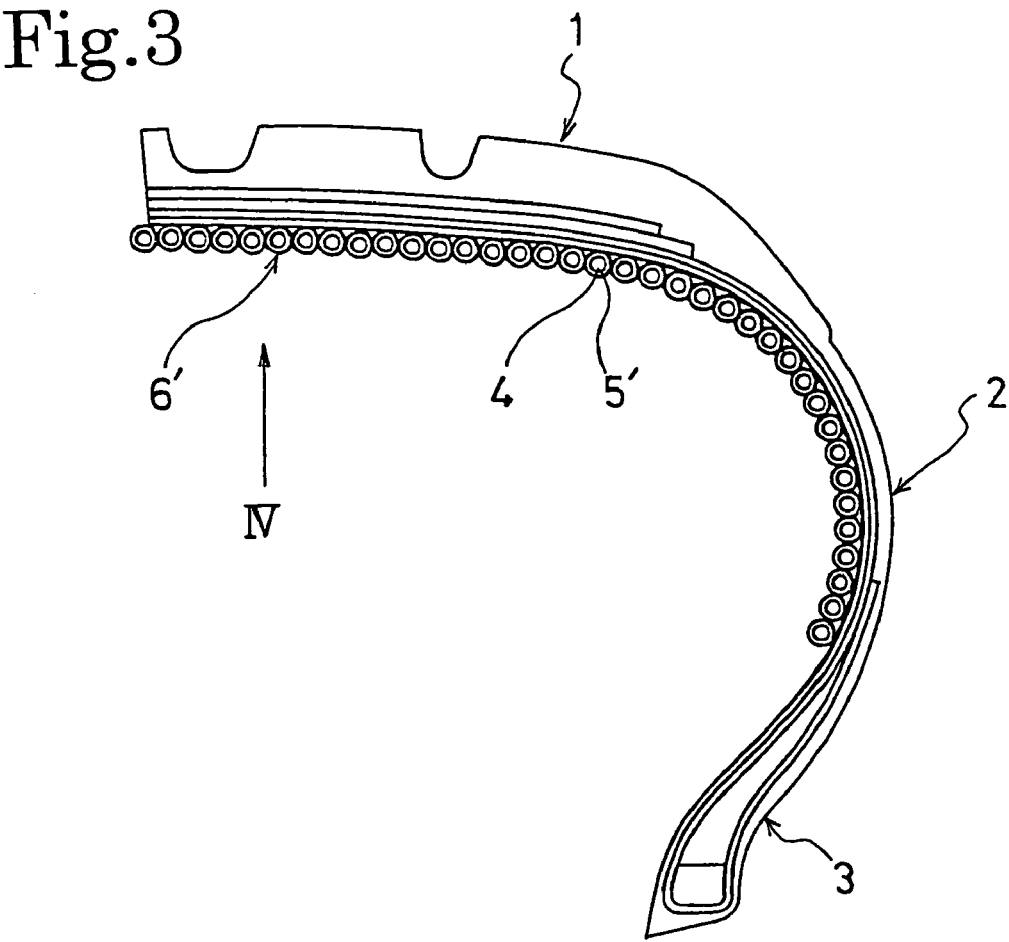
FIG. 3 is a half cross section in the meridian direction of a pneumatic tire comprised of another embodiment of the present invention.
Figure 4:
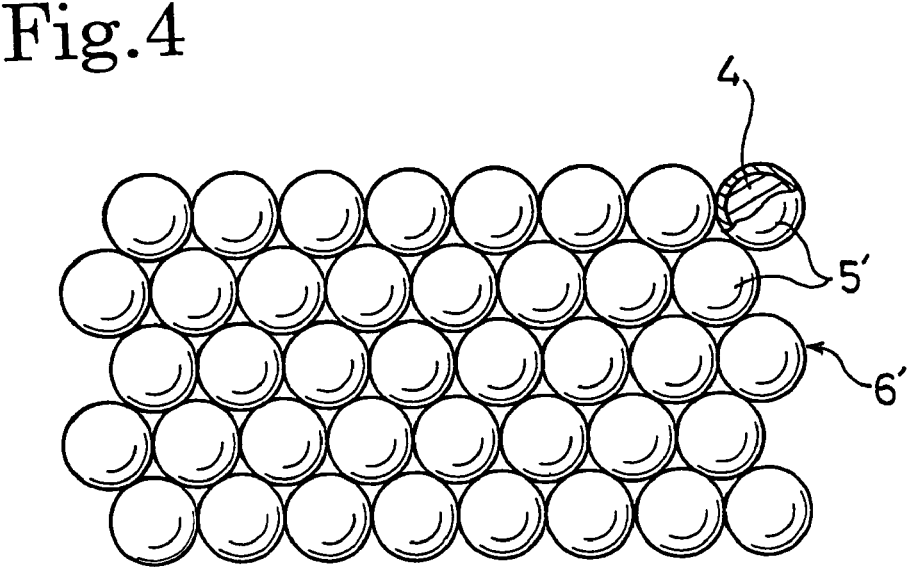
FIG. 4 is an arrow view of the tire inner surface along the arrow IV in FIG. 3.

FIG. 3 and FIG. 4 show a pneumatic tire comprised of another embodiment of the present invention.

It comprises a tread 1, a side wall 2 and a bead portion 3 as in the tire of the embodiment of FIG. 1 and FIG. 2.

The inner surface of the aforementioned tire is lined with a number of micro balloons 5' filled with a seal material 4 of adhesive composition or the like, with their sides closely contacted with each other without gap, forming a puncture prevention layer 6'. The puncture preventive layer 6' may be installed in an area corresponding at least to the tread 1, in the tire inner surface, however, in the illustrated example, it is also installed up to an area corresponding to both side walls 2. Besides, the shape of the micro balloon 5' is preferably a complete round sphere as the illustrated example, however, in addition, it may be oval sphere, polyhedron or the like.

In the pneumatic tire of this embodiment also, in case where a nail is stuck through the tread 1 during the travel of a vehicle, the micro balloon 5' will be broken through by the nail, and the inner seal material 4 flows out. The seal material 4 will adhere in a way to envelop the surrounding of the nail, and seals the nail hole, and in case when the nail falls off by the centrifugal force or the like, it remains in the nail hole, closing the same.

Besides, since the seal material 4 is wrapped in the micro balloon 5', and restricted, it will not drift to the tread central side, even if the centrifugal force is applied by a high speed revolution of the tire. Hence, the puncture sealing will not decrease in the tread shoulder area. Further, as the puncture preventive layer 6' is composed by arranging a number of micro balloons 5', not only the splice portion is not formed in the tire circumferential direction, but also wrinkles are not generated in the tire lateral direction end portion area, thereby a good tire uniformity can be maintained. Moreover, in the aforementioned pneumatic tire, as it is unnecessary to arrange a reinforcement layer of large rigidity in the side wall as in the run flat tire, the riding comfort will not be deteriorated.

Figure 5:
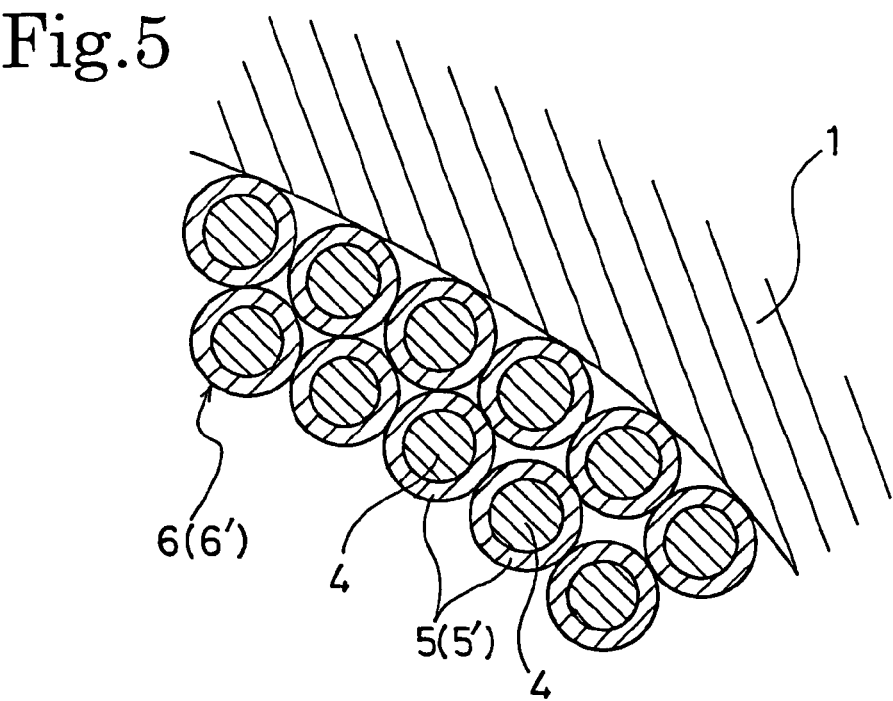
FIG. 5 a partial section in the meridian direction of a pneumatic tire comprised of still another embodiment of the present invention.

In the embodiment of FIG. 1 and FIG. 2 mentioned above, the puncture preventive layer 6 is composed by arranging only one layer of tube 5, and in the embodiment of FIG. 3 and FIG. 4, the puncture preventive layer 6' is composed by arranging only one layer of a number of micro balloons 5'. However, the number of layer is not necessarily limited to one, but a multi-layered structure of two or more layers may be adopted as in the embodiment shown in FIG. 5. Especially, it is advantageous to adopt the multi-layered structure for the area corresponding at least to the tread 1. By adopting such multi-layered structure, the nail penetrated into the tread 1 breaks through the tube 5 or the micro balloon 5' more securely, thus the puncture sealing can be improved.

Also, in the present invention, the puncture preventive layer should be installed in a tire inside area corresponding at least to the tread. However, further as necessary, it may be arranged to extend up to an area corresponding to the side wall. The thickness of the puncture preventive layer is not limited especially; however, it is preferably 3 to 6 mm, and more preferably 4 to 5 mm. By making the thickness of the puncture preventive layer not less than 3 mm, the puncture sealing can be improved. On the other hand, by making it not more than 6 mm, the increase in tire weight can be restrained.

In the present invention, as for the seal material to be filled the tube or micro balloon composing the puncture preventive layer, this material is not particularly limited, provided that it involves an adhesive liquid material, adhering easily to a nail or the like penetrating through the tread, and sealing the nail hole. For instance, elastomer can be used preferably as seal material. As the elastomer, at least one kind selected from a group comprising, for example, butyl rubber, polyisobutylene, natural rubber, isoprene rubber and polybutene. These elastomers can hold low air permeability in a normal use state without tire puncture.

Low-molecular oligomer such as amorphous polyolefin, paraffin oil, liquid polybutene or the like, tackifier such as petroleum resin or the like, or carbon black may be added to the aforementioned elastomers. Also, an appropriate crosslinking agent or vulcanizing agent may be formulated to make the elastomer heat resistant. For instance, zinc oxide, stearic acid, p-quinonedioxime or the like may be formulated.

Besides, rubber latex may be used as seal material. As for this rubber latex, one solidified by adding, for instance, resorcin-formalin resin or the like may also be used.

Moreover, for the seal material, its color may be adopted among colors other than black that the tread rubber has. By using a seal material having a color other than black, the puncture can be found easily, by viewing seal material leaked outside the tire from the puncture hole when the tire is punctured.

In the present invention, the material of the tube or micro balloon composing the puncture preventive layer is not particularly limited, provided that it breaks easily when a nail or the like is stuck, and allows the inside seal material to leak out. However, rubber like elastic material can be used preferably. As this rubber like elastic material, for instance, variety of rubbers used commonly in the rubber industry such as butyl rubber, silicone rubber, natural rubber polyisopropylene, styrene-butadiene rubber, polybutadiene rubber or the like, or other elastomer resins can be cited.

The size of tube or micro balloon is not particularly limited. However, preferably, for the former tube, its inner diameter is preferably not less than 2 mm, and more preferably not less than 3 mm. By making the inner diameter not less than 2 mm, the required amount of seal material can be secured, and the puncture sealing can be improved. On the other hand, it is advantageous to set the outer diameter thereof not more than 6 mm, and further not more than 5 mm. By making the outer diameter not more than 6 mm, an excessive increase in the tire weight can be restricted. Besides, the thickness is preferably not more than 0.5 mm, and more preferably 0.2 to 0.3 mm. If the thickness exceeds 0.5 mm, a nail or the like does not penetrate into the hollow portion of the tube, a sufficient amount of seal material may not leak out, and it is feared that the sealing performance should be deteriorated.

For the latter micro balloon, its inner diameter is preferably not less than 2 mm, and more preferably not less than 3 mm. By making the inner diameter not less than 2 mm, the required amount of seal material can be secured, and the puncture sealing can be improved. On the other hand, it is advantageous to set the outer diameter thereof not more than 6 mm, and further preferably not more than 5 mm. By making the outer diameter not more than 6 mm, an excessive increase in the tire weight can be restricted. Besides, the thickness is preferably not more than 0.5 mm, and more preferably 0.3 to 0.4 mm. If the thickness exceeds 0.5 mm, a nail or the like does not penetrate into the hollow portion of the micro balloon, a sufficient amount of seal material may not leak out, and it is feared that the sealing performance should be deteriorated.

It should be noted that, for the inner diameter and the outer diameter in case where the arrow view shape of the aforementioned tube or micro balloon is not circular, the diameter of the inscribed circle in respect to the hollow portion inner wall shall be used for the inner diameter, and the circumscribed circle in respect to the outer wall for the outer diameter. In addition, if the thickness is irregular, the mean value of the maximum thickness and the minimum thickness shall be used.

The method of manufacturing the aforementioned pneumatic tire according to the present invention is not particularly limited. For example, there is proposed a method of windingly sticking with an adhesive a tube having seal material wrapped therein to the tire inner surface of a cured tire circumferentially of the tire and continuously and spirally, in case of a tire where a tube forms the puncture preventive layer. However, preferably, a method of lining by windingly sticking a tube having seal material wrapped therein to the tire inner surface corresponding at least to the tread of an unvulcanized tire before vulcanization circumferentially of the tire and continuously and spirally with its side surfaces closely contacted with each other and, thereafter, vulcanizing and adhering this lining layer as puncture prevention layer by vulcanizing the unvulcanized tire, is more excellent in terms of workability or the like.

In case of a tire forming the puncture preventive layer with micro balloon, there is proposed a method of sticking with an adhesive a number of micro balloons having seal material wrapped therein to the tire inner surface of a cured tire in way to make them into contact closely with each other. However, preferably, similarly to the foregoing, a method of lining by spraying uniformly a number of micro balloons having seal material wrapped therein, to the tire inner surface corresponding at least to the tread of an unvulcanized tire before vulcanization, closely contacted with each other and, thereafter, vulcanizing and adhering this lining layer as puncture prevention layer by vulcanizing the unvulcanized tire, is better.

The method of manufacturing the micro balloons having seal material wrapped therein is not particularly limited, provided that the particulate material is formed to envelop the outer periphery of the seal material. For instance, a tube is formed with a material for the micro balloon, and the seal material is enclosed in this tube. Next, they can be produced by cutting this tube enclosed with the seal material closing the portion with a predetermined short interval. The cutting may be executing by a fusing means or the like.

Now, the present invention shall be described by means of examples, but the present invention is not limited to these examples.

EXAMPLES 1 TO 7

A tube having seal material wrapped therein and made respectively of materials described in Table 1 and having the material, inner diameter, the outer diameter and the thickness described in Table 1, is lined spirally in the tire circumferential direction, on the tire inner surface of a plurality of tire bodies having the same tire size 205/65R15 94S each other, and these unvulcanized tires are vulcanized, for manufacturing seven kinds of pneumatic tires (examples 1 to 7) having the aforementioned lining layer as puncture preventive layer. It should be noted that all of seal materials listed in Table 1 are adhesive liquids, while all of tubes are soft rubber like.

Figure 6:
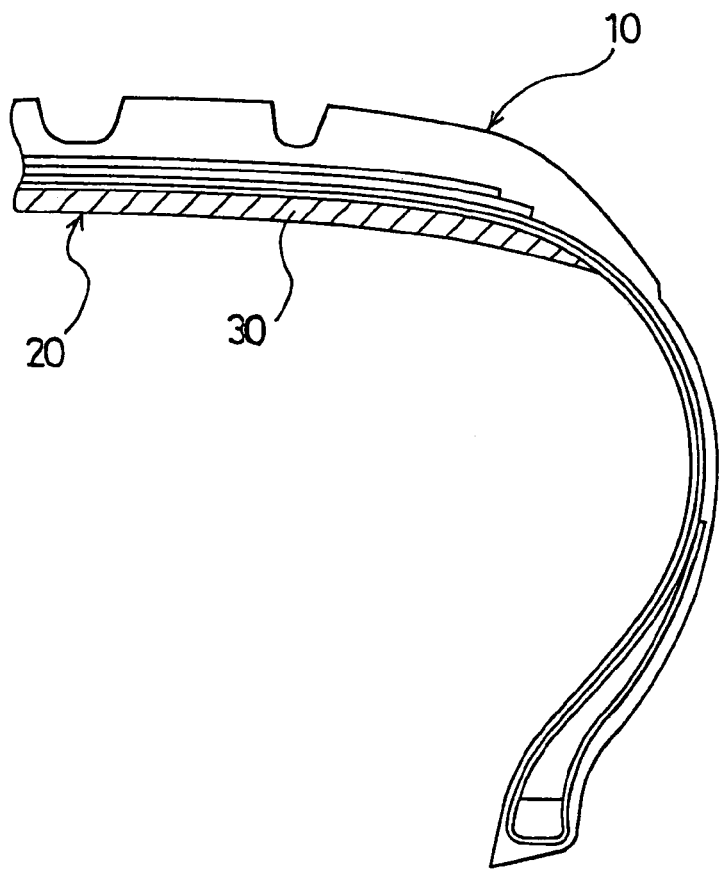
FIG. 6 is a half cross section in the meridian direction of a pneumatic tire of the prior art.

In addition, for comparison, a pneumatic tire wherein the puncture preventive layer is formed by injecting seal material in the tire inner surface as the structure shown in FIG. 6 (comparative example 1), with the same tire size, and a run flat tire wherein a hard rubber layer of crescent shape portion is inserted in the side wall (comparative example 2), also with the same tire size, are manufactured.

Each of obtained nine kinds of tire was mounted with a FF car with per-cylinder displacement of 2 liters, the air pressure is adjusted to 220 kPa for the front and 200 kPa for the rear, the riding comfort and puncture sealing performance mentioned below were assayed, for obtaining the results mentioned in Table 1.

Riding Comfort:

The practical riding test is performed with the aforementioned FF vehicle and 50 km/h on a straight test course having irregularities, and the riding comfort was assayed by sensitivity by three (3) professional panelists. The riding comfort was evaluated by good ○, fair Δ and poor X.

Puncture Sealing Performance:

The aforementioned FF vehicle has traveled 100 km at 100 km/h, then a nail is stuck into and pulled out from the tread shoulder of the tire and the vehicle is driven further 100 km at 100 km/h, after leaving for 24 hours, the tire air pressure is measured, and the reduction rate of the air pressure was calculated and evaluated. The air pressure decrease rate was evaluated by ⊚ for less than 4%, ○ 4 to 5%, Δ more than 5% and less than 10% and X not less than 10%.

TABLE 1

|  | Comparative example 1 | Comparative example 2 | Example 1 | Example 2 | Example 3 |
|---|---|---|---|---|---|
| Tire structure | FIG. 6 | Run flat | FIGS. 1, 2 | FIGS. 1, 2 | FIGS. 1, 2 |
| Tube |  |  |  |  |  |
| Material | — | — | Butyl rubber | Butyl rubber | Butyl rubber |
| Inner diameter (mm) | — | — | 2 | 3 | 4 |
| Outer diameter (mm) | — | — | 3 | 4 | 5 |
| Thickness (mm) | — | — | 0.5 | 0.5 | 0.5 |
| Seal material | Butyl rubber | — | Butyl rubber | Butyl rubber | Butyl rubber |
| Riding comfort | ○ | Δ | ○ | ○ | ○ |
| Puncture sealing | X | — | ○ | ⊚ | ⊚ |

|  | Example 4 | Example 5 | Example 6 | Example 7 |
|---|---|---|---|---|
| Tire structure | FIGS. 1, 2 | FIGS. 1, 2 | FIGS. 1, 2 | FIGS. 1, 2 |
| Tube |  |  |  |  |
| Material | Butyl rubber | Silicone rubber | Butyl rubber | Silicone rubber |
| Inner diameter (mm) | 2 | 3 | 3 | 3 |
| Outer diameter (mm) | 3.6 | 4 | 4 | 4 |
| Thickness (mm) | 0.8 | 0.5 | 0.5 | 0.5 |
| Seal material | Butyl rubber | Rubber latex | Rubber latex | Butyl rubber |
| Riding comfort | ○ | ○ | ○ | ○ |
| Puncture sealing | Δ | ⊚ | ⊚ | ⊚ |

From the results shown in Table 1, for the tire of the Comparative example 1, the seal material can not close sufficient the puncture hole made by sticking a nail into the tread shoulder, and the puncture sealing performance has deteriorated, because the seal material has drifted near the tread center by the centrifugal force of the tire, during the vehicle travel of first 100 km. While, for the run flat tire of the Comparative example 2, the riding comfort is mediocre, because the rigidity is important in the side wall. On the other hand, for the tires of the present invention in the examples 1 to 7, the riding comfort was not problematic, and the puncture sealing performance was also with in the range of practical level. Also, the tire uniformity did not cause any particular problem. Further, the tire having the tube inner diameter not less than 2 mm and the thickness not more than 0.5 mm presented a good puncture sealing and a further better performance in case where the inner diameter is not less than 3 mm.

EXAMPLES 8 TO 14

An adhesive was applied to the tire inner surface of a plurality of cured tires having the same tire size 205/65R15 94S each other, and a number of micro balloons having seal material wrapped therein and made respectively of materials described in Table 2 and, having the material, inner diameter, outer diameter and thickness described in Table 2 were sprayed in sheet, for manufacturing seven kinds of pneumatic tire (examples 8 to 14) having these micro balloons lined in sheet. It should be noted that all of seal materials listed in Table 1 are adhesive liquids, while all of tubes are soft rubber like.

Thus obtained seven kinds of tires were assayed for the same riding comfort and puncture sealing performance as executed for the examples 1 to 7 and the results are mentioned in Table 2 together with those of the aforementioned comparative examples 1, 2.

TABLE 2

|  | Comparative example 1 | Comparative example 2 | Example 8 | Example 9 | Example 10 |
|---|---|---|---|---|---|
| Tire structure | FIG. 6 | Run flat | FIGS. 3, 4 | FIGS. 3, 4 | FIGS. 3, 4 |
| Micro balloons |  |  |  |  |  |
| Material | — | — | Butyl rubber | Butyl rubber | Butyl rubber |
| Inner diameter (mm) | — | — | 2 | 3 | 4 |
| Outer diameter (mm) | — | — | 3 | 4 | 5 |
| Thickness (mm) | — | — | 0.5 | 0.5 | 0.5 |
| Seal material | Butyl rubber | — | Butyl rubber | Butyl rubber | Butyl rubber |
| Riding comfort | ○ | Δ | ○ | ○ | ○ |
| Puncture sealing | X | — | ○ | ⊚ | ⊚ |

|  | Example 11 | Example 12 | Example 13 | Example 14 |
|---|---|---|---|---|
| Tire structure | FIGS. 1, 2 | FIGS. 1, 2 | FIGS. 1, 2 | FIGS. 1, 2 |
| Micro balloons |  |  |  |  |
| Material | Butyl rubber | Silicone rubber | Butyl rubber | Silicone rubber |
| Inner diameter (mm) | 2 | 3 | 3 | 3 |
| Outer diameter (mm) | 3.6 | 4 | 4 | 4 |
| Thickness (mm) | 0.8 | 0.5 | 0.5 | 0.5 |
| Seal material | Butyl rubber | Rubber latex | Rubber latex | Butyl rubber |
| Riding comfort | ○ | ○ | ○ | ○ |
| Puncture sealing | Δ | ⊚ | ⊚ | ⊚ |

From the results shown in Table 2, for the pneumatic tires of the examples 8 to 14, the riding comfort was not problematic, and the puncture sealing performance was also with in the range of practical level. Also, the tire uniformity did not cause any particular problem. Further, the tire having the micro balloon inner diameter not less than 2 mm and the thickness not more than 0.5 mm presented a good puncture sealing and a further better performance in case where the inner diameter is not less than 3 mm.

INDUSTRIAL APPLICABILITY

As mentioned hereinabove, since the pneumatic tire of the present invention is characterized by that it has a puncture preventive layer composed by windingly sticking a tube having seal material wrapped therein circumferentially of the tire and continuously and spirally and another pneumatic tire of the present invention is characterized by that it has a puncture preventive layer formed by sticking micro balloons having seal material wrapped therein with their sides closely contacted with each other, any splice portion will not be formed in the tire circumferential direction, nor the seal material be drifted in the tire lateral direction by the centrifugal force during the tire revolution. Consequently, it becomes possible not to result in the deterioration of the tire uniformity, nor in the deterioration of the puncture sealing due to the fluidity of seal material, and a large applicability to the tire industry can be expected.

What is claimed is:

1. A pneumatic tire comprising:
   a puncture preventive layer on a tire inner surface, the puncture preventive layer being spherical micro balloons filled with a seal material;
   wherein one of the micro balloons contacts another of the micro balloons,
   wherein the seal material is selected from the group consisting of butyl rubber, polyisobutylene, natural rubber, isoprene rubber, polybutene, and rubber latex,
   wherein for each of said micro balloons, the inner diameter is not less than 2 mm, the outer diameter is not more than 6 mm, and the wall thickness is not more than 0.5 mm, and
   wherein the micro balloons are attached to the tire inner surface.

2. The pneumatic tire of claim 1, wherein said puncture preventive layer is arranged on an area of the tire inner surface corresponding at least to a tread.

3. The pneumatic tire of claim 2, wherein said puncture preventive layer is arranged up to an area of the tire inner surface corresponding to right and left side walls from said tread.

4. The pneumatic tire of claim 1, wherein the thickness of said puncture preventive layer is 3 to 6 mm.

5. The pneumatic tire of claim 1, wherein the material of the micro balloons is selected from the group consisting of butyl rubber, silicone rubber, natural rubber, polyisopropylene, styrene-butadiene rubber, and polybutadiene rubber.

6. A method of manufacturing a pneumatic tire, comprising steps of:
   forming, on an inner surface of an unvulcanized tire, a lining layer by sticking spherical micro balloons filled with a seal material in a manner such that the micro balloons contact with each other about their side surface and thereafter,
   forming said lining layer into a puncture prevention layer by curing the unvulcanized tire,
   wherein for each of said micro balloons, the inner diameter is not less than 2 mm, the outer diameter is not more than 6 mm, and the wall thickness is not more than 0.5 mm,
   wherein the seal material is selected from the group consisting of butyl rubber, polyisobutylene, natural rubber, isoprene rubber, polybutene, and rubber latex, and
   wherein the micro balloons are attached to the tire inner surface.

* * * * *